June 1, 1965  D. J. NASH  3,186,462
LADIES' PURSE AND RETRACTIBLE MIRROR
Filed Jan. 4, 1962
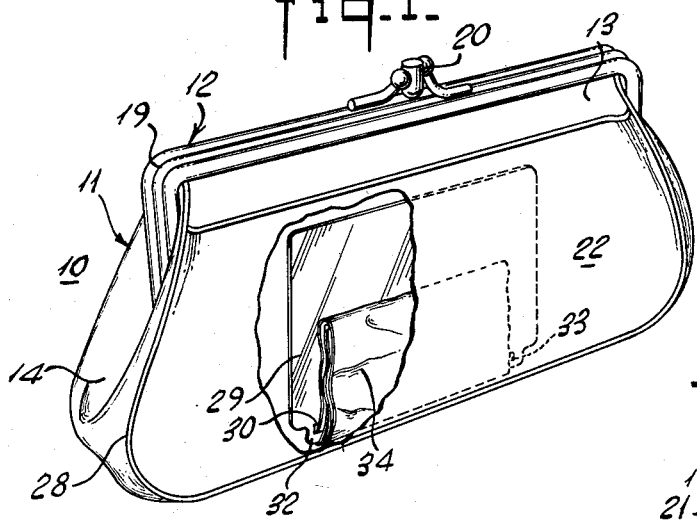
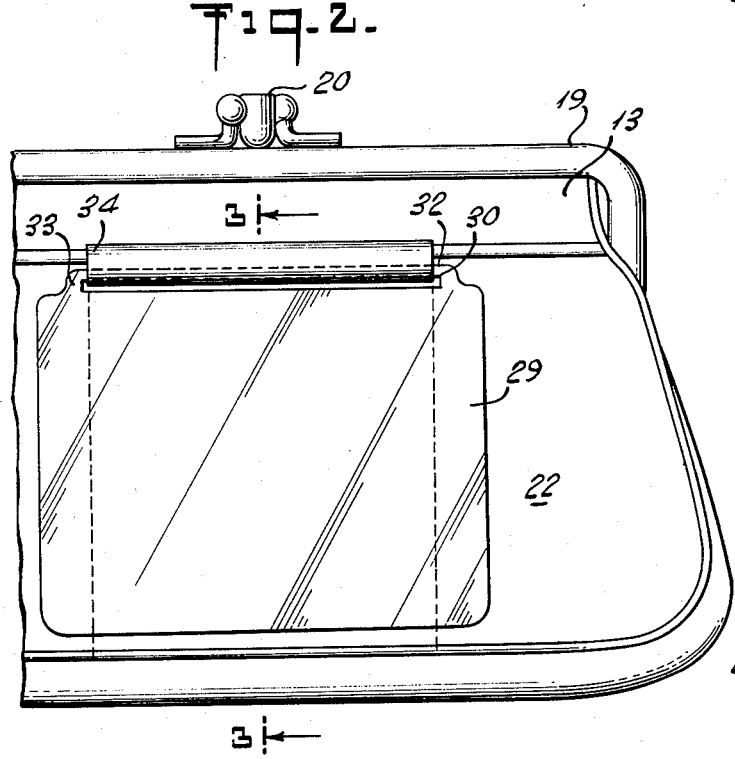
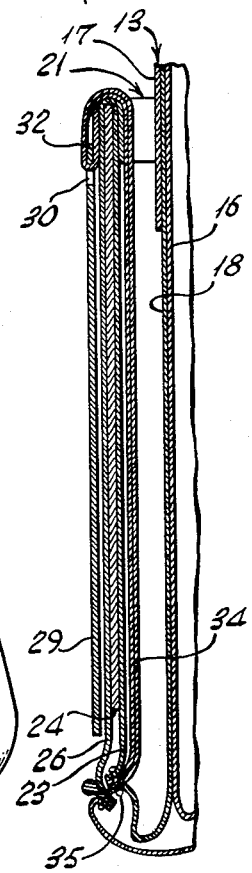
INVENTOR.
DANIEL J. NASH
BY
William R. Liberman
ATTORNEY ered June 1, 1965

3,186,462
LADIES' PURSE AND RETRACTIBLE MIRROR
Daniel J. Nash, Jersey City, N.J., assignor to Nash Inc., Jersey City, N.J., a corporation of New Jersey
Filed Jan. 4, 1962, Ser. No. 164,332
2 Claims. (Cl. 150—34)

The present invention relates generally to improvements in receptacles such as ladies' handbags, pocketbooks, wallets and the like, and it relates in particular to an improved handbag provided with a mirror as an accessory thereto.

The most common object found in a ladies' handbag or pocketbook is a mirror of one type or another. The mirror is located in the handbag usually unattached thereto and readily removable or is fastened to the interior of the handbag by a band, chain or other elongated flexible member. These conventional arrangements possess many drawbacks and disadvantages. Where the accessory mirror is of the unattached type it is frequently lost or forgotten and although a special compartment may be provided for it inside the handbag it usually is not properly replaced and when desired must be recovered from the mass of other paraphernalia generally found in the handbag. The conventional handbag mirror is usually of a limited size, somewhat inconvenient to use, since it must be housed in the handbag and would otherwise excessively interfere with the use of the handbag as such. The drawbacks of the loosely carried handbag mirror, except for its possible loss or misplacement, are not remedied by attaching the mirror to the handbag in the usual fashion. Furthermore in both cases where the mirror is loose or attached, unless the handbag can be laid down aside from the mirror, the use of the mirror requires two hands, one for the mirror and one for the handbag. It is thus apparent that the conventional ladies' handbag provided with a mirror as an accessory leaves much to be desired.

It is thus a principal object of the present invention to provide an improved receptacle such as a handbag, pocketbook, wallet or the like.

Another object of the present invention is to provide an improved ladies' handbag or pocketbook having a mirror as an accessory thereto.

Still another object of the present invention is to provide an improved handbag for ladies having a mirror which is readily accessible without access to the interior of the handbag proper.

A further object of the present invention is to provide an improved handbag for ladies provided with a mirror of suitable size which may be easily and rapidly manipulated as desired to an operative or housed condition without opening the handbag proper and which may be conveniently employed without the necessity of laying down the handbag.

Still a further object of the present invention is to provide a handbag of the above nature characterized by its ruggedness, simplicity, ease of operation and low cost.

The above and other objects of the present invention will become apparent from a reading of the following description taken in conjunction with the accompanying drawing, wherein:

FIGURE 1 is a front perspective view, partially broken away, of a handbag embodying the present invention, the mirror being illustrated in its retracted position;

FIGURE 2 is a front elevational view thereof partially broken away for convenience of illustration, the mirror being shown in its extended position; and FIGURE 3 is an enlarged sectional view taken along line 3—3 in FIGURE 2.

In a sense the present invention contemplates the provision of a handbag of the character described comprising a receptacle-defining body member having formed therein a first opening affording access into said receptacle, a pocket carried by said body member and having a second opening on the exterior of said handbag and affording access into said pocket, a mirror member slideably registering with said pocket and movable between a retracted position nested in said pocket and an extended position removed from said pocket, and means fastening said mirror member to said handbag and limiting the movement thereof to substantially its extended position, said mirror member being swingable about a transverse axis when in its extended position.

According to a preferred form of the present invention the handbag body member is provided with the conventional hinged frame member which is secured in the usual manner to the border of the body member surrounding the opening thereto and is manipulatable to an open position or a locked closed position. A pocket front wall is secured along its bottom and side edges to the front face of the body member and defines therewith the open topped mirror pocket. The mirror is of rectangular configuration and has formed therein a longitudinal slot along the lower edge thereof as oriented when nesting in the mirror housing pocket. A flexible band having a width substantially equal to the length of the mirror slot passes through the slot and has its free ends secured to the inside bottom of the pocket. The length of the extended doubled band is a little greater than the height of the pocket so as to permit the complete extraction of the mirror from the pocket and its swinging to a position depending substantially from the upper edge of the pocket front wall.

Referring now to the drawing which illustrates a preferred embodiment of the present invention, reference numeral 10 generally designates the improved handbag which comprises a main body member 11 and a handbag frame 12 of conventional construction. The body member 11 includes a front wall 13, a rear wall, a bottom wall, and gusset type side walls 14 joining the body member front rear and bottom walls. The walls of body member 11 are of multi-ply construction, including an inner layer or liner 16, an outer or facing layer 17 and an intermediate layer or interliner 18. The various plies of the body member walls may be of various materials as desired, for example the facing layer may be formed of leather, fabric, plastic or the like as may the other layers in any well known fashion.

The handbag frame 12 is of the usual construction and comprises a pair of U-shaped channel members 19 hinged to each other at the free ends of opposite legs thereof. The upper edges of the body member front rear and side walls are secured to corresponding frame members 19 by being clamped between the legs of the respective channels. Thus, access into the handbag proper is afforded through the open frame member which may be selectively closed and releasably locked by the associated latch assembly 20.

An open topped mirror pocket 21 is located on the front face of the handbag body member 11 and is delineated by the body member front wall 13 and a pocket front wall 22 substantially coextensive therewith. The pocket front wall 22 extends along the full width of the body member front wall 13 and along the sides thereof to a point short of the top. Like the body member walls, the pocket front wall 22 is of multi-ply construction including an inner layer or lining 23, an interliner 24 and a facing layer 26, which plies may be formed of the same material as the corresponding plies of body member 11. The upper border of pocket wall facing layer 26 is folded over the top edge of the pocket wall 22 and cemented, stitched or otherwise secured thereto, to finish the upper border of the pocket wall 22. It should be noted that the facing ply 17 on the front wall of the body member extends from the top thereof to a point a short distance below the top border of the pocket wall 22. The contiguous edges of the body member walls and the pocket wall are joined by stitching and engaging a finishing binder 28 in the usual fashion.

Removably housed in pocket 21 is a mirror member 29 preferably formed of a flat polished metal plate. Mirror member 29 is of substantially rectangular configuration, of greater width than height and having rounded corners. A longitudinally extending slot 30 is formed along an edge of the mirror member 29 for substantially the full width thereof to delineate an elongated coupling bar 32 joined to the mirror by side legs 33.

Mirror 29 is connected to pocket 21 by a flexible band or web 34 of substantially the width of the slot 30, which band may be formed of fabric, plastic or other suitable material. Band 34 passes through slot 30 and around coupling bar 32, and the free ends thereof are secured to the bottom of the pocket 21 by the line of stitching 35 which joins the contiguous edges of layers 18 and 23 lining the inside of pocket 21. As seen in FIGURES 2 and 3 of the drawing, the length of the doubled band 32 is a little greater than the height of the pocket wall 22 to support and permit the suspension of the mirror member along the front face of pocket wall 22 when band 34 is in its fully extended position.

Considering now the operation of the handbag described above, when mirror member 29 is not in use it is housed in pocket 21, as illustrated in FIGURE 1 of the drawing. In this retracted position, the slotted edge of mirror 29 is lowermost in the pocket 21 and the doubled band 34 may be folded over itself and sandwiched between the lower confronting faces of mirror member 29 and the pocket front wall 22. In order to position the mirror member 29 to its operative position, it is manually withdrawn from the pocket 21 thereby to extend band 34 to its full length and the mirror 29 is then released to drop into superposition along the front face of the pocket wall 22, as shown in FIGURES 2 and 3 of the drawing. In this position of the mirror, it may be conveniently employed and does not possess the drawbacks and disadvantages accompanying the use of the conventional arrangements. The mirror member 29 may be readily retracted by swinging it to an upwardly directed position and inserting it into the pocket 21 along the rear face thereof whereby the band 34 is folded to the housed position illustrated in FIGURE 1.

While there has been described and illustrated a preferred embodiment of the present invention, it is apparent that numerous alterations, omissions and additions may be made without departing from the spirit thereof.

Having now described my invention, what I claim and desire to secure by Letters Patent is:

1. A handbag comprising walls defining an open topped bag body member including a front wall, a frame including a pair of hinged members movable between opened and closed positions and affixed to the upper edges of said body member to selectively open and close said bag, a pocket wall affixed along its side and bottom edges to said body member front wall to define therewith an open topped pocket, a rectangular mirror slideably nesting in said pocket and having an elongated slot formed therein along the lower edge thereof, and a flexible band looped through said slot and having its free ends secured to the inside of said pocket, said band being of a length to limit the movement of said mirror member to an extended position outside the pocket, whereby said mirror is disposed against the outer face of the pocket wall and substantially between the upper and lower marginal edges thereof.

2. The handbag of claim 1, wherein the free ends of said band are secured to the bottom of said pocket.

References Cited by the Examiner
UNITED STATES PATENTS

| | | | |
|---|---|---|---|
| 991,252 | 5/11 | Trask | 150—29 |
| 1,617,855 | 2/27 | Lewis | 150—28 |
| 1,627,063 | 5/27 | Quigan et al. | 150—34 |
| 1,674,153 | 6/28 | Appel | 132—83.5 |
| 2,061,293 | 11/36 | Stember | 150—34 |
| 2,754,532 | 7/56 | Kanehl et al. | 15—209 |

GEORGE O. RALSTON, *Primary Examiner.*

WALTER A. SCHEEL, EARLE J. DRUMMOND,
*Examiners.*